US008641530B1

(12) United States Patent
Penson

(10) Patent No.: US 8,641,530 B1
(45) Date of Patent: Feb. 4, 2014

(54) SYSTEM AND METHOD FOR REAL TIME TRADING COMPUTER GAME

(76) Inventor: Maxime Penson, Wyckoff, NJ (US)

( * ) Notice: Subject to any disclaimer, the term of this patent is extended or adjusted under 35 U.S.C. 154(b) by 296 days.

(21) Appl. No.: 13/037,398

(22) Filed: Mar. 1, 2011

Related U.S. Application Data

(60) Provisional application No. 61/340,260, filed on Mar. 15, 2010.

(51) Int. Cl.
*A63F 13/00* (2006.01)

(52) U.S. Cl.
USPC .................... 463/42; 463/16; 463/30; 463/31

(58) Field of Classification Search
USPC ................. 463/20, 40–42, 16, 30–31; 705/37
See application file for complete search history.

(56) References Cited

U.S. PATENT DOCUMENTS

| | | | | |
|---|---|---|---|---|
| 7,040,982 | B1 * | 5/2006 | Jarvis et al. | 463/9 |
| 7,359,876 | B1 * | 4/2008 | Redpath et al. | 705/37 |
| 8,128,474 | B2 * | 3/2012 | Amaitis et al. | 463/16 |
| 2001/0032169 | A1 * | 10/2001 | Sireau | 705/37 |
| 2006/0105839 | A1 * | 5/2006 | Graeve et al. | 463/42 |
| 2006/0199631 | A1 * | 9/2006 | McGill et al. | 463/16 |
| 2007/0111777 | A1 * | 5/2007 | Amaitis et al. | 463/16 |
| 2008/0071694 | A1 * | 3/2008 | Blomgren et al. | 705/36 R |
| 2010/0009743 | A1 * | 1/2010 | Amaitis et al. | 463/25 |
| 2011/0065494 | A1 * | 3/2011 | Kennedy et al. | 463/25 |

* cited by examiner

*Primary Examiner* — Ronald Laneau
*Assistant Examiner* — Ross Williams
(74) *Attorney, Agent, or Firm* — Bardmesser Law Group

(57) ABSTRACT

A computer game for dynamic real time trading where the rates of the tradeable objects (such as securities prices) are presented/displayed by using changes in properties of game objects (such as position, speed, shape, size, color or texture, etc.). The system employs player computer(s), real time data feeds from the investment objects to be traded and a game application that dynamically renders the data feed onto a gamer's visual display. The game application renders the data feed via a Conversion Engine Price To Game Model that depicts the price changes of the tradeable objects as the behavior of the game objects by changing the displayed properties. The player interacts with the game visual display to actually execute "buy" or "sell" actions or a reverse action (e.g., "short sell" then "buy").

19 Claims, 5 Drawing Sheets

SYSTEM AND METHOD FOR REAL TIME TRADING COMPUTER GAME

CROSS-REFERENCE TO RELATED APPLICATIONS

This application claims priority to U.S. Provisional Patent Application No. 61/340,260, filed on Mar. 15, 2010, which is incorporated herein by reference in its entirety.

BACKGROUND OF THE INVENTION

1. Field of the Invention

The present invention is relates to computer game systems and more particularly, to creating real time game environment that is tied to securities market participation.

2. Description of the Related Art

A number of computer applications provide on-line stock trading opportunities for the subscribers or users of a particular broker system. Typically, a broker (or a respective web application) assists a user in buying or selling stocks and collects the commission. However, this environment does not provide in itself an element of gaming or gambling desired by some users.

A variety of computer games that involve elements of gambling (such as, for example, on-line casino games) create a situation where a user plays against a house (i.e., an application that runs the game). These gaming environments, while creating an illusion of real time random bets and wins, are programmed to make the game user lose his money with the highest possible probability. Typically it is implemented by embedded internal subjective attributes or game factors (settings of the random number generators)—user plays against "the house" and is statistically destined for losing.

The creators of conventional gambling-based computer games are not interested in users winning the game. Thus, none of the existing games provide a true random real time gaming environment, where subjective user attributes (i.e., user selected data) are used in the game in order to change the odds.

Accordingly, it is desired to have an on-line gaming environment that provides a true random nature without predetermined odds, where a user can win or lose based on his own gaming skills and his own decisions. There is also a need in the art for an interactive game that involves stocks or other commonly tradable entities, where the game provider only provides the gaming environment, but does not control the game process.

SUMMARY OF THE INVENTION

The present invention is related to a method and system for an on-line computer game. The present invention provides a method, system and computer program products for real time trading that substantially obviates one or several of the disadvantages of the related art.

In one aspect of the invention, a method and a computer game for dynamic real time trading by using visual characteristics of the traded entities (such as position, speed, shape, size, color or texture, etc) is provided. The system employs player computer(s), real time data feeds from the investment objects exchange (i.e., game objects) to be traded and a computer game application that dynamically renders the data feed onto a visual display or onto a computer monitor.

According to an exemplary embodiment, the program renders the data feed via a Conversion Engine Price To Game Model that depicts the price changes of the game objects by changing visual characteristics displayed (such as, for example, position, speed, shape, size, color, texture, etc.). The graphic representation does not necessarily reflect to the player the context of the interaction with the real function. The player(s) interacts with the visual display to execute "buy" or "sell" actions or a reverse action (i.e., for example, "short sell" then "buy").

The player interaction with the display can use any type of gaming or simulation activity, such as, for example: aim and shoot; catch and release; take and give; chase and catch; tag and grab; open and close, buy and sell; and any arbitrary Game Models. Basically, any actions that capture two moments in time enhance the enjoyment of the gaming experience.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

Figure 2:
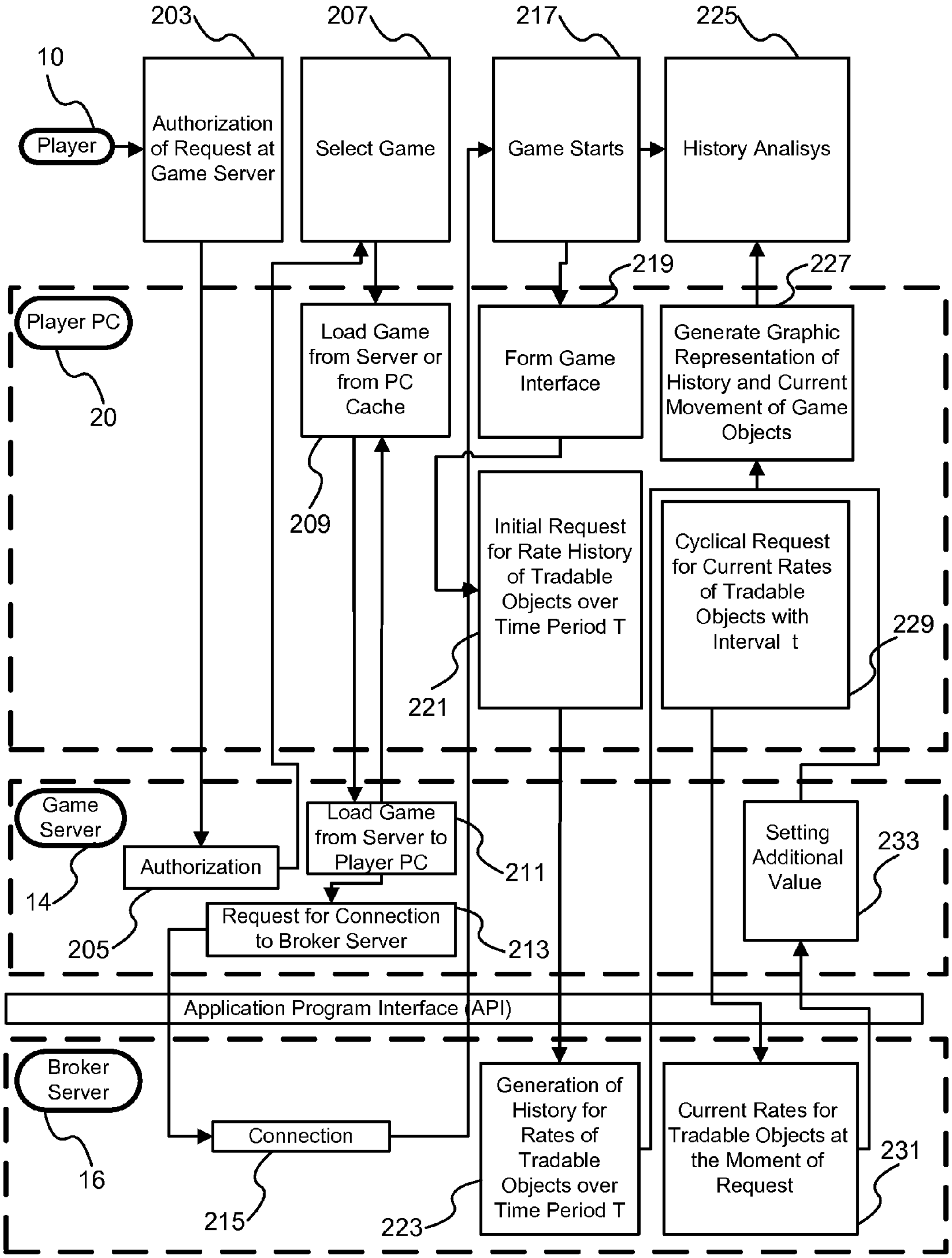
FIG. 2 illustrates a game flow diagram in accordance with the exemplary embodiment.
Figure 3:
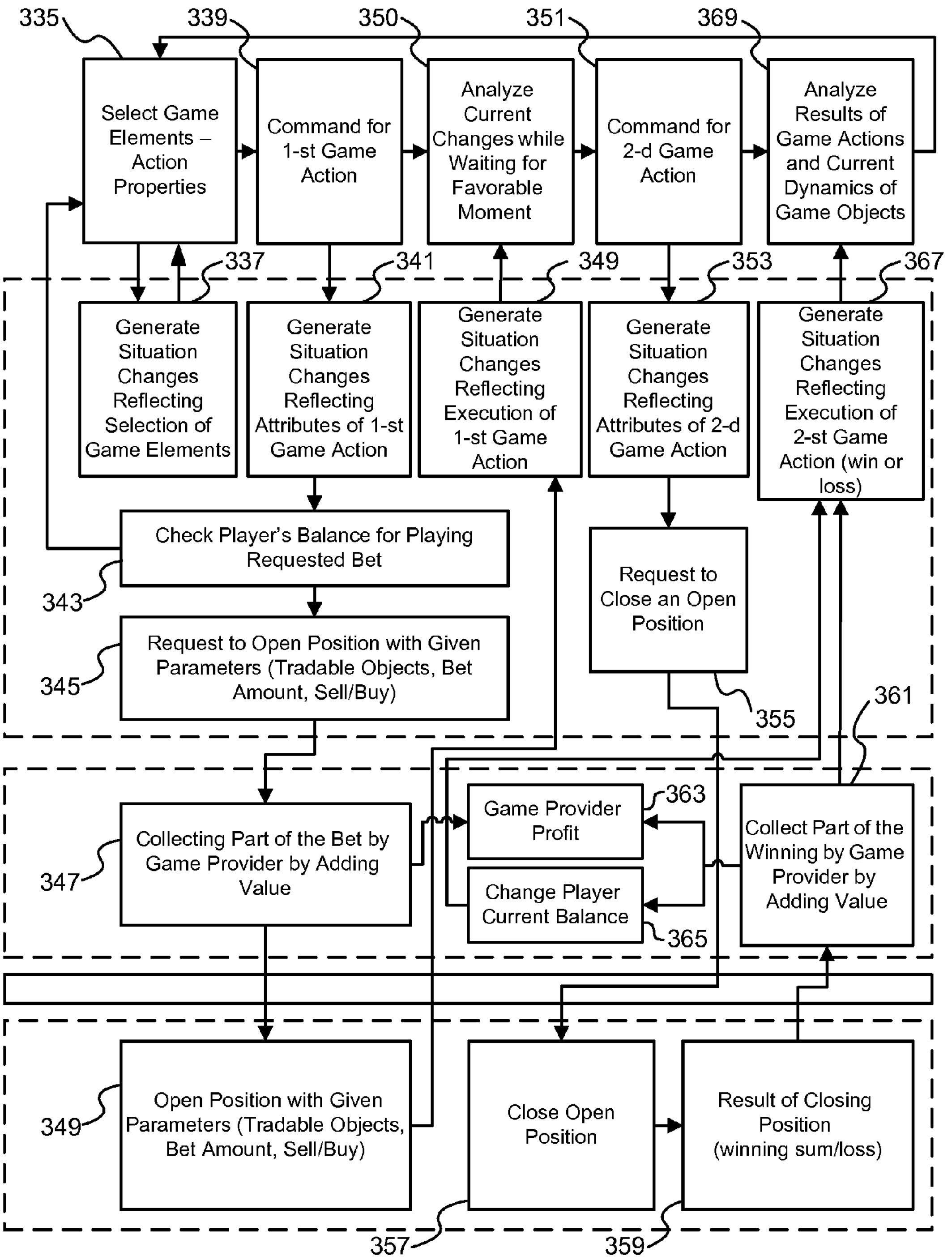
Figure 4:
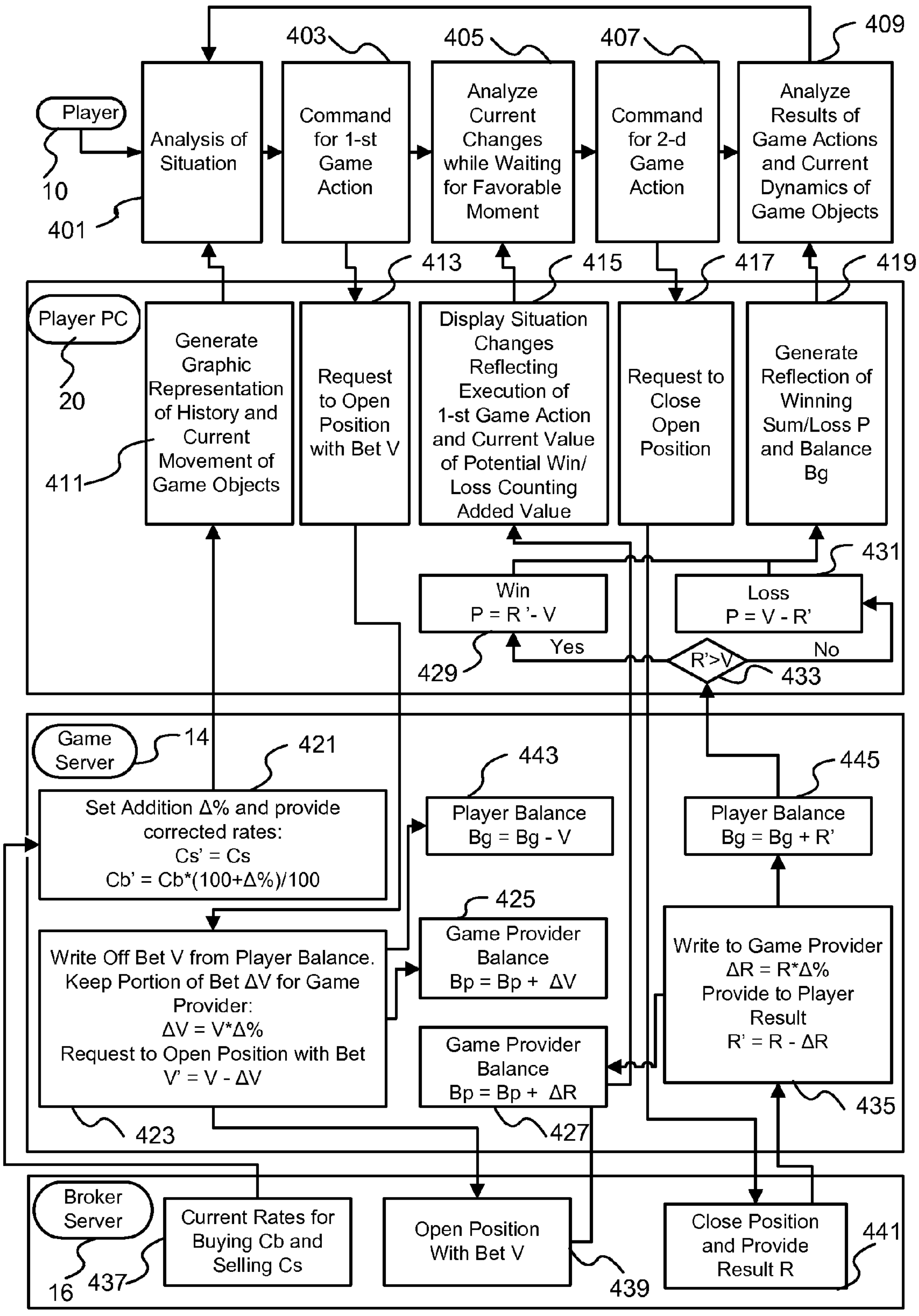
Figure 5:
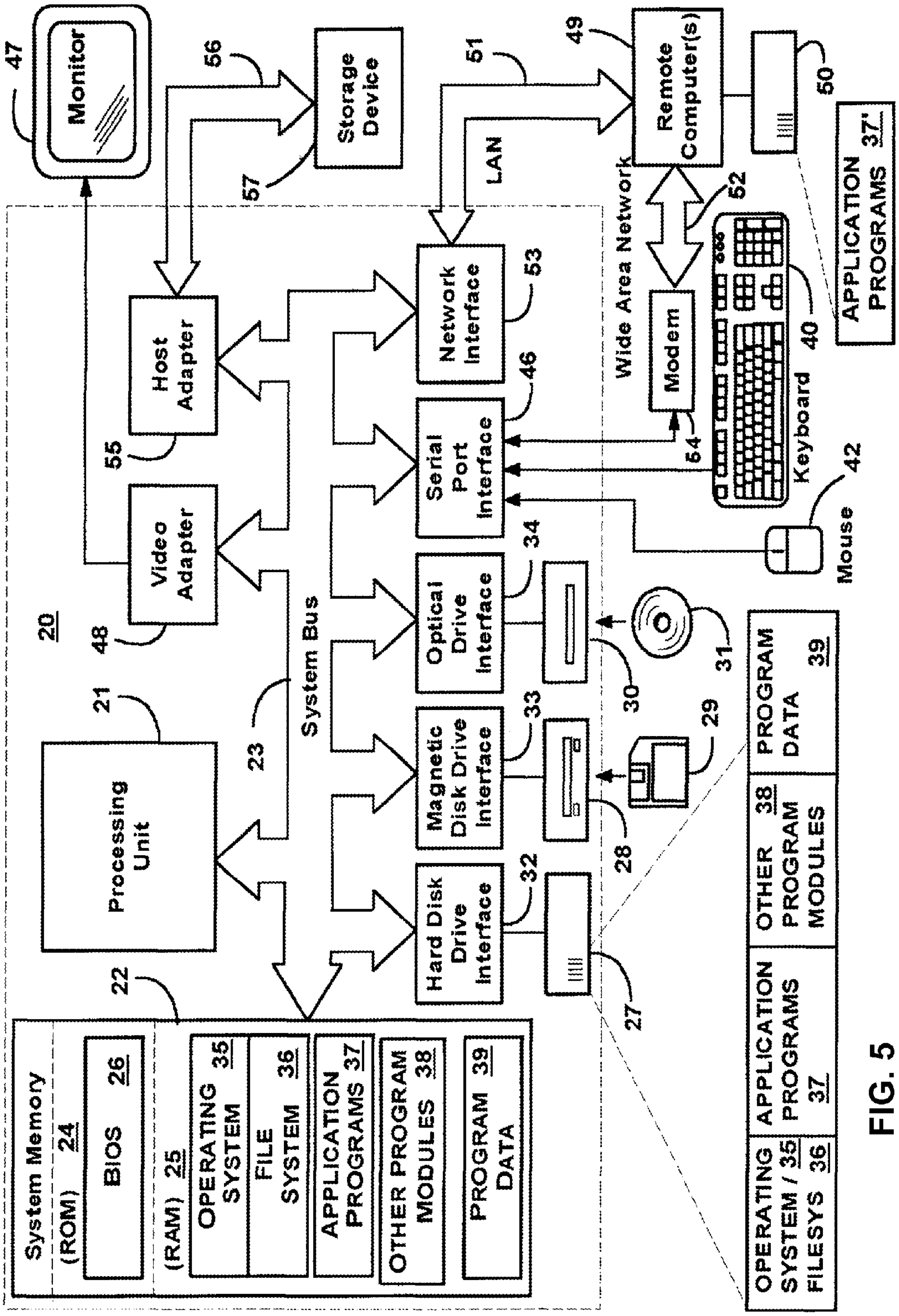

FIG. 3 continues from FIG. 2 and illustrates detailed game flow in accordance with the exemplary embodiment;

FIG. 4 illustrates a diagram of the game including exemplary financial calculations;

FIG. 5 illustrates a schematic of an exemplary computer (or server) system that can be used for implementation of the invention.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method for dynamic real time trading by using visual characteristics of the traded entities (such as position, speed, shape, size, color or texture, etc) is provided. The system employs player computer(s), real time data feeds from the tradeable objects (i.e., securities whose value is represented by game objects) to be traded provided by a broker server via a game server and a computer program that dynamically renders the data feed on a visual display or a computer monitor in a specific graphic form.

Figure 1:
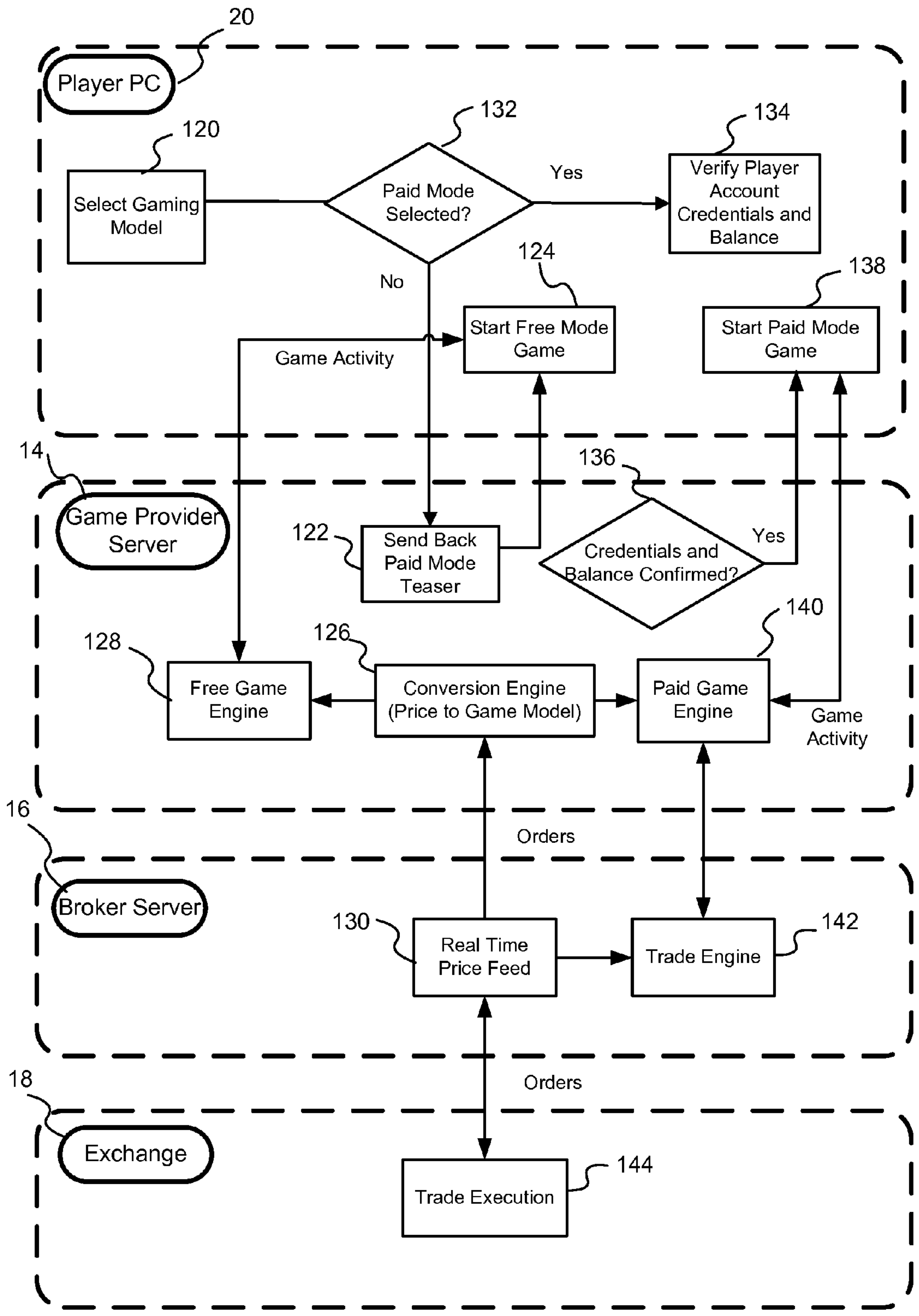
FIG. 1 illustrates a game system and functionality flow in accordance with the exemplary embodiment.

FIG. 1 illustrates a game system and functionality flow in accordance with the exemplary embodiment. A player PC (or a similar device with a CPU) 20 has a game application running on it. The player PC 20 is connected to a game provider server 14 which in turn is connected to a broker server 16 connected to trading exchange 18 (for example, any stock exchange like the NYSE or the NASDAQ).

The player PC is connected to a visual display module such as a monitor (not shown) or a TV set and means of interacting with the display in order to execute game commands or actions, which are then transformed into trading commands "buy" or "sell." Note that the interactive means enable one or more players to interact with the visual display to initiate the transactions. The game computer program running on the user PC 20 provides both a free game mode and a paid game mode. A drop-down menu or other type of game interface can provide the player with the selections such as whether to engage the free mode game or the paid mode game. The selection can be implemented as separate common GUI tools, such as buttons or as any other convenient mode select option.

Other player selections include the trading market for a particular session selected from a group of real time tradable objects (i.e., such as for example, stocks, bonds, commodities, currency exchange, etc., represented by game objects). Player can select a gaming model (types of game scenarios) in block 120. The game model can be specially developed for this application, or can be traditional games, such as roulette, slot machine, wheel of fortune, etc., adapted to use in the system described herein. If, in step 132, the player has selected the free mode (i.e., a simulation mode, if the game model supports it), the system provides a prompt to the video display via block 122 to consider the paid mode as an alternate option. An associated marketing "teaser" can be presented to the player in order to convince him to pursue the paid mode.

Assuming the player chooses in step 132 first to pursue the free game mode. The player is prompted to confirm that choice via another drop-down menu or other common GUI tools of functional block 124. After the free mode is started in block 124, a conversion engine 126 responds to the free mode election to enable a free game engine 128 to initiate and proceed with the game activity. The conversion engine 126 is fed real time pricing information from a real time price feed module 130 located on broker server 16.

The real time price feed 130 includes prices of any stock, commodity, financial instrument, currency exchange rate, etc. traded on an exchange or an auction, through brokerages or other registered entities, so long as they support real time trading. The real time price feed 130 is provided to the free game engine 128 which transforms it into a game-like presentation for rendering on the visual display device of the player PC 20.

The game-like presentation depicts the price change of the selected investment (i.e., game object) in a form that reflects changes of visual characteristics (such as position, speed, shape, size, color, texture, etc.). The game-like presentation does not necessarily reflect the context of interaction with the underlying real function, since the game actions in effect mask buy/sell commands. According to the exemplary embodiment, the game system renders the real time price information in a manner that allows for interaction means, for example: aim and shoot; catch and release; take and give; chase and catch; tag and grab; open and close, buy and sell, or other similar two-step actions that capture two separate moments in time.

If the player elects the paid mode from the menu 132, whether initially or after participating in the free mode, the system requests appropriate identification information so as to verify the player and his association with the particular account through interface 134 on the user PC and block 136 on the game provider server 14. If the account is insufficient based on the required minimum, assuming the player's identity has been confirmed, the player would be prompted to add funds to his account as well as (optionally) be reminded of the required fee for participating in this mode, for a predetermined time. Once the account credentials and balance are confirmed, the system authorizes the player to initiate the paid mode game via drop down menu or other common GUI tools prompted by system functional block 138.

The conversion engine 126 now engages the paid game engine 140, where the game activity is converted to buying and selling orders directed to a trade engine 142 for a subsequent execution through a trade execution module 144 associated with the exchange 18 on which the game object (i.e., investment) is traded. The underlying goal of the paid mode is for the trader (i.e., player) to make a related profit. In either of the two modes, visual characteristics and behavior of the object displayed on the game monitor are controlled by either the free game engine 128 or paid game engine 140 based on the real time data feed 130 received into the respective game engine.

In the free mode game, the player plays the game for entertainment only. However, the system is programmed to periodically remind the player of the paid mode so that if and when he desires to he can pursue his "success" in the free mode in the paid mode that can make him money if likewise successful. In reality, the player's actions in the paid mode result in buying and selling of securities or any investment instrument traded in real time environment with associated profit or loss. A summary of the player's transactions are maintained with periodic prompts, if necessary, to the player to advise him when his account balance falls below a predetermined minimum.

FIG. 2 illustrates a game flow diagram in accordance with the exemplary embodiment. A player 10 requests an authorization for playing the game in block 203. The player authorization is performed in authorization module 205 located on a game server 14. After authorization is completed in block 205, the player selects the game in block 207. Then the game is loaded from the game server 14 (block 211) or from the player PC cache in block 209. Then, the game server 14 requests a connection with a broker server 16 (see block 213). Connection is implemented by connection module 215 on the broker server side 16. Once connected, the game starts in block 217.

In block 219 the game interface is formed and the initial request for rate history (or values of corresponding selected securities) of game objects is generated in block 221. The rate history over time period T is generated in block 223 on the broker server 16. The generated history is provided to block 227 (on player PC 20) where the graphic representation of history and movement of the game objects (i.e., changes in prices of the corresponding security) is generated and provided to the player for history analysis (block 225).

According to the exemplary embodiment, the game generates cyclical requests for current rates of the tradable objects (i.e., game objects) within pre-set time intervals t in block 229 implemented on the player PC 20. These requests are sent to the broker server 16, where, in block 231, the current rates at the moment of the request are recorded. Then, the game server 14 sets the additional value for the current rates in block 233 and provides the corrected rates to the player for analysis in block 225 via the graphics block 227, which forms the rates into convenient graphic form for rendering to the player.

FIG. 3 illustrates a detailed game flow in accordance with the exemplary embodiment. Player selects game elements (i.e., action properties) and the changes in the situation based on the selected game elements are generated by the game block 337. Then, the player performs a first game action (see block 339). Subsequent changes in game situation are generated in block 341. The game checks player's balance for playing a requested (by first game action) bet in block 343. A request for opening the position with the given game parameters is formed in block 345. The game provider collects a portion of the bet in block 347.

Then, the collected bet portion is added to game provider profit in block 363. The position with given parameters is opened in block 349. The game situation changes triggered by execution of the first game action are generated in block 349. The player analyzes current changes while waiting for a favorable moment, in block 350. Then, the player issues a command for a second game action in block 351. The subsequent changes in the game situation bases on the attributes of the second game action are generated in block 353. The game requests to close the opened position in block 355 and the opened position is closed in block 357.

Results (win amount or loss) of closing of the position are generated in block 359. A portion of the result of closing the position is collected by the game provider in block 361. Subsequently, the game provider profit is increased by the collected amount in block 363 and player current balance is changed in block 365. Then the changes of the game situation (win or loss) triggered by execution of the second game action are generated in block 367 and rendered to the user in block 369 for analyzing results of the game actions and the current dynamics of the game objects.

FIG. 4 illustrates a diagram of the game including exemplary financial calculations. A player 10 begins the game by analyzing the situation in block 401. A command for a first game action is issued in block 403. In step 405, player analyses current changes while waiting for a favorable moment. Then, in step 407, player issues a command for a second game action. In step 409 the player 10 analyses results of the game actions and current dynamics of the game objects.

After the first game action is executed in step 403, a request to open a position with bet V is generated in block 413 and the bet V is written off from player balance in block 423. The portion of the bet V is kept by the game provider. Therefore the actual bet is:

$V'=V-\Delta V$, where $\Delta V$ is the portion that goes to the game provider in step 425, where the game provider balance is increased accordingly. The player balance is decreased in block 443 by the bet amount V. Position with bet V' is opened in block 439 (on the broker server 16) and the game provider balance is increased in block 425.

The changes reflecting the execution of the first game action are provided by block 415 for analysis in block 405. These changes also reflect the current value of the potential win or loss. After the player 10 executes a second game action in block 407, a request to close opened position is generated in block 417. This request is executed in block 441, the position is closed and the result R is provided to block 435. Then, in block 435, a portion of the result $\Delta R$ is given to the game provider and the result $R'=R-\Delta R$ is used for player balance calculation performed in block 445. Then the current player balance is:

$$Bg=Bg+R'$$

The game provider balance is increased by in block 427 by $\Delta R$ (the value charged by the game provider).

Then, in block 433, the game checks if the player made profit in the current round. If the result of the game larger than the bet ($R'>V$), then the player has won the amount $$P=R'-V \text{ (a difference between the game result and the bet).}$$

If in block 433 a loss is determined ($R'<V$) the loss amount is calculated in block 431 as $P=V-R'$ (a difference between the bet and the game result). The P value calculated in either of the blocks 429 and 431 is provided to block 419 where reflection of win or loss is generated along with the player balance and provided to the player for analysis in block 409.

The current rates for buying and selling (Cb and Cs) are provided by block 437 (located on the broker server 16) to block 421 on the game provider server 14. The addition to the rates is set in block 421 and the corrected rates are provide to block 411 (on the user PC 20) where graphic representation of history and current movement of game objects is generated and rendered to the player in block 401 for analysis.

In other words, the game provider is interested in the player having maximum winnings, since the more the player wins, the greater the commission (and the more likely the player is to come back and play more)—unlike many games where the players plays "against the house."

It should be appreciated by those skilled in the art, that the scheme of the real time trading game depicted in the above figures provides for a unique real time gaming experience, where the game advantageously provides a player with opportunities to analyze the real time market situation in a convenient graphical form and make decision for buying and selling that are independent of the game itself. The trade game only provides the gaming environment, but does not play against the user and does not control the game outcome, thereby giving a user unlimited winning opportunities for a small fraction of player's bets and additions to the rates that are charged by the game provider.

With reference to FIG. 5, an exemplary system for implementing the invention includes a general purpose computing device in the form of a computer (or a similar device with a CPU) 20 (or game server 14 or broker server 16) or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 200, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for a real time gaming environment, where the game provide does not affect the actual game process and its outcome.

It should also be appreciated that various modifications, adaptations and alternative embodiments thereof may be made within the scope and spirit of the present invention. The invention is further defined by the following claims.

What is claimed is:

1. A computer-implemented system for real time trading game, the game comprising:

a player computing device having a processor and a memory;

a visualization device connected to the player computing device for displaying player interactions with the game;

the player computing device is connected to a game provider service, which is in turn connected to an online securities exchange broker service for executing securities trading orders, wherein a relationship of a player's gaming activity and interaction between the game provider service and the broker service is hidden from the player, such that the player making securities markets transactions with the game objects is hidden from the player;

a plurality of game objects reflecting a scenario of the game and whose behavior is based on information received from the broker service by the player computer;

wherein behavior of the game objects represents behavior of tradeable objects in real time, based on data provided by the broker service such that the game scenario visually appears to the player as a game, including game characters, game actions and/or game graphics, and wherein the player does not know which securities market process controls the game objects under a guise of the game scenario;

a visualization processing module for rendering history and behavior of the game objects; and a win and loss analysis module, wherein:

wherein the player interacts with the game objects based on the game scenario such that actions of the player in the game scenario are interpreted by the game provider service as a command for the broker service to make a securities trading order;

the game server receives real time rate feeds for the tradeable objects from the broker service and passes them to the player computing device;

the player computing device converts tradeable objects' prices into the game model presentation using a conversion engine;

the player's profit and loss depends on the securities trading orders corresponding to the player's actions; and the game server's profit is based on commissions from the player's securities market trading activity; and the game server maintains the game regardless of whether any player is participating at that moment, so long as the security market is functioning.

2. The system of claim 1, further comprising an authorization module for authorizing the player to use the game and to interface to the game server.

3. The system of claim 1, further comprising a game mode selection module that presents the player with a choice of game models for selection of one game model.

4. The system of claim 3, wherein the modules are provided to the player computer from the game server.

5. The system of claim 3, wherein the game models are selected are provided to the player computer from the game server.

6. The system of claim 1, further comprising a player credentials and balance verification game module.

7. The system of claim 1, wherein the game objects correspond to real time tradable objects comprising any of:

stocks;

bonds;

securities;

currencies; and commodities.

8. The system of claim 1, wherein the game server performs player authorization.

9. The system of claim 1, wherein the player makes the securities market transactions by executing game commands.

10. The system of claim 9, wherein amounts and volumes of the player's securities market transactions are checked against the player balance.

11. The system of claim 9, wherein the game server calculates and collects portions from the player's securities market transactions orders such as to open or to close positions as a service fee.

12. The system of claim 1, wherein the game provider server maintains the player's account and balance.

13. The system of claim 1, wherein current buying prices of the game objects are increased and current selling prices of the game objects are decreased by a game provider's service margin prior to being displayed on the visualization device.

14. The system of the claim 1, wherein, in case of a loss, the loss amount is taken out of the player's account.

15. The system of claim 1, wherein the player interacts with the game via the visual display using any of action modes:

aim and shoot;
catch and release;
take and give;
chase and catch;
tag and grab;
open and close;
buy and sell.

16. The system of claim 1, further comprising a cyclical request module for acquiring current exchange rates to buy or sell tradeable objects for periodic representation of a behavior of the tradeable objects on the display.

17. The system of claim 1 further comprising means for interfacing to a trade engine module on a broker side.

18. A computer-implemented method for a real time trading game, the method comprising:

(a) authorizing a player;

(b) connecting a player's computing device to a game provider service, which is in turn connected to an online securities exchange broker service for executing securities trading orders, wherein a relationship of a player's gaming activity and interaction between the game provider service and the broker service is hidden from the player, such that the player's securities markets transactions with the game objects are hidden from the player;

(c) generating a graphic representation of a history game objects;

(d) rendering the graphic representation to the player;

(e) acquiring real time current rates of the tradeable objects in order to display behavior of corresponding the game objects;

(f) correcting adjusting the current rates by calculating service fees and collecting portions of the player securities market transactions and results of closing of player positions as the service fee;

(g) displaying the rates in a game model;

(h) generating a graphic representation of the current rates and object behavior and rendering it to the player; and (i) receiving a securities market transaction request from the player, subtracting a service fee from the securities market transaction and placing an order in a securities market for securities corresponding to the tradeable objects;

wherein the player's profit and loss depends on the securities trading orders corresponding to the player's actions;

the game server's profit is based on commissions from the player's securities market trading activity;

the game objects reflect a scenario of the game and behavior of the game objects is based on information received from the broker service;

the behavior of the game objects represents behavior of tradeable objects in real time, based on data provided by the broker service such that the game scenario visually appears to the player as a game, including game characters, game actions and/or game graphics, the player does not know which securities market process controls the game objects under a guise of the game scenario;

the player interacts with the game objects based on the game scenario such that actions of the player in the game scenario are interpreted by the game provider service as a command for the broker service to make a securities trading order, and the game server maintains the game regardless of whether any player is participating at that moment, so long as the security market is functioning.

19. The method of claim 18, wherein the tradeable objects are any of:

stocks;
bonds;
securities;
currencies; and
commodities.

* * * * *